United States Patent
Ackerman et al.

(10) Patent No.: US 8,902,043 B1
(45) Date of Patent: Dec. 2, 2014

(54) MITIGATING CONFORMATIONAL BIAS IN AUTHENTICATION SYSTEMS

(71) Applicant: EMC Corporation, Hopkinton, MA (US)

(72) Inventors: Karl Ackerman, Topsfield, MA (US); Kenneth D. Ray, Seattle, WA (US); Lawrence N. Friedman, Arlington, MA (US); Roy Dagan, Herzliya (IL); Alex Vaystikh, Hod Hasharon (IL); Roy Hodgman, Wenham, MA (US)

(73) Assignee: EMC Corporation, Hopkinton, MA (US)

( * ) Notice: Subject to any disclaimer, the term of this patent is extended or adjusted under 35 U.S.C. 154(b) by 237 days.

(21) Appl. No.: 13/630,849

(22) Filed: Sep. 28, 2012

(51) Int. Cl.
G05B 19/00 (2006.01)
G05B 23/00 (2006.01)
G06F 7/04 (2006.01)
G06F 12/00 (2006.01)

(52) U.S. Cl.
USPC ........... 340/5.8; 340/5.2; 340/5.81; 340/5.23; 726/5; 726/6; 726/17; 726/18

(58) Field of Classification Search
CPC ...................................................... G06F 21/34
See application file for complete search history.

(56) References Cited

U.S. PATENT DOCUMENTS

| 7,412,081 | B2 * | 8/2008 | Doi | 382/118 |
|---|---|---|---|---|
| 8,442,932 | B2 | 5/2013 | Zangwill | |
| 2009/0158404 | A1 * | 6/2009 | Hahn et al. | 726/5 |
| 2009/0212902 | A1 * | 8/2009 | Haddock | 340/5.2 |

* cited by examiner

*Primary Examiner* — Jennifer Mehmood
*Assistant Examiner* — Pameshanand Mahase
(74) *Attorney, Agent, or Firm* — BainwoodHuang (57) ABSTRACT

An authentication method and system to combat confirmation bias provides for an authentication system that upon matching an access request to a record for a given user in an authentication system further interrogates a set of secondary sources to determine that the individual requesting access is in fact the correct user.

18 Claims, 5 Drawing Sheets

| | Name | Weight | IP Addr |
|---|---|---|---|
| 401(1) | VPN | 75 | x.x.x.1 |
| 401(2) | E-ZPASS | 30 | x.x.x.2 |
| 401(3) | Credit | 50 | x.x.x.3 |
| 401(4) | Travel | 40 | x.x.x.4 |

403

| | DATE | TIME | LOC | OTHER | Name |
|---|---|---|---|---|---|
| 403(1) | 9/10 | 09:10 | +30 | x.y.y.1 | VPN |
| 403(2) | 9/10 | 09:03 | +28 | $1.25 | E-ZPASS |
| 403(3) | 9/09 | 20:10 | +35 | $45.00 | Credit |
| 403(4) | 9/01 | 08:15 | +2700 | | Travel |

405

| 405(1) | 405(2) | 405(3) | 405(4) |
|---|---|---|---|
| 120 | 25 | 0 | 0 |

MITIGATING CONFORMATIONAL BIAS IN AUTHENTICATION SYSTEMS

BACKGROUND

A conventional credentialing system requires an employee entering a facility to swipe his or her card key at a card reader to gain entry to that facility. The card reader transmits the information collected from the card to an authentication server and the credentialing server evaluates that information in order to authorize the user. If the employee is currently employed and is allowed to enter the particular facility or area of a facility, then the credentialing server approves the employee's request for entry and issues a signal to the mechanism which prevents entry to allow passage for the employee in question. In parallel with issuing the signal to unlock a door, the credentialing server sends a digital image or other information about the employee to a guard at a monitoring station who is monitoring the facility entrance or area entrance.

The guard at the monitoring station is required to view the digital image of the employee and check that the individual entering the facility or area of a facility resembles the digital image. If the individual passing through the station does not resemble the employee, the guard is required to challenge the individual and further make a secondary determination that the individual who just scanned the card is the employee to whom that card belongs.

SUMMARY

Unfortunately, there are deficiencies with the above-described conventional credentialing system which requires a visual inspection of the individual entering the facility by the guard. In particular, the guard seldom views the image displayed at his monitor because in the vast majority of cases, the individual entering the facility is in fact the correct individual. Once concern with such a system is that over time, the guard inherently trusts the credentialing system to correctly authenticate the user and therefore no longer views the digital image or the individual entering the facility.

In contrast to the above described conventional credentialing system which is subject to confirmational bias of the human guard, an improved technique requests additional information from secondary sources and uses the data retrieved from the secondary sources to determine the likelihood that the individual being authenticated is in fact the individual he or she claims to be. One aspect of the improved technique is that it requests physical location data from various sources to determine if the user is possibly at another physical location at the time the individual attempts entry to the facility.

Advantageously, the improved technique overcomes the confirmational bias the guard develops over time from continuously having the correct individuals enter the facility. For example, when an individual attempts to enter a facility and the company's VPN server shows that he or she just logged in from an IP address located 30 miles away, the improved technique warns the human guard with a new type of alert of the discrepancy so he or she may take action.

One embodiment of the improved technique is directed to a method of mitigating confirmational bias during authentication of a user by having an authentication server receive from an input device a request for authentication of a user, the request including user identification information and access point information. The authentication server then compares the user identification information with user identification records in an authentication database. The authentication server matches the user identification information with a user identification record in the authentication database. An authentication server retrieves a set of secondary records of secondary information of the user from a set of secondary sources; for each record of the set of secondary records calculate a score, the score indicative of a difference between the access point information and secondary information of the record. The authentication server aggregates the score of each record of the set of secondary records to form an aggregated score. The authentication server then compares the aggregated score to a predetermined value and initiates a secondary authentication upon the aggregate score exceeding the predetermined value. If the authentication server does not match the user identification information to a user identification record in the authentication database, it then denies the user's authentication attempt.

An alternative embodiment of the improved technique is directed to a system for mitigating confirmational bias during authentication. The system includes an authentication circuit, the authentication circuit arranged and configured to receive from an input device a request for authentication of a user, the request including user identification information and access point information. The authentication circuit is further arranged and configured to compare the user identification information with user identification records in an authentication database. Upon the user identification information matching a user identification record in the authentication database, the system also includes a secondary authentication circuit, the secondary authentication circuit arranged and configured to retrieve a set of secondary records of secondary information of the user from a set of secondary sources. The system then calculates for each record of the set of secondary records, a score, the score indicative of a difference between the access point information and secondary information of the record. The secondary authentication circuit is further arranged and configured to aggregate the score of each record of the set of secondary records to form an aggregated score. The secondary authentication circuit is also further arranged and configured to compare the aggregated score to a predetermined value and then initiate secondary authentication upon the aggregate score exceeding the predetermined value. If the user could not be authenticated, the authentication circuit further arranged and configured to return a status of authentication failure.

Another alternative embodiment of the improved technique is directed to a non-transitory computer readable storage medium with a computer program stored thereon executed by a processor to perform a method of mitigating confirmational bias during authentication.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique requests additional information from secondary sources and uses the data retrieved from the secondary sources to determine the likelihood that the individual being authenticated is in fact the individual he or she claims to be. One aspect of the improved technique is that it requests physical location data from various sources to determine if the user is possibly at another physical location at the time the individual attempts entry to the facility.

Figure 1:
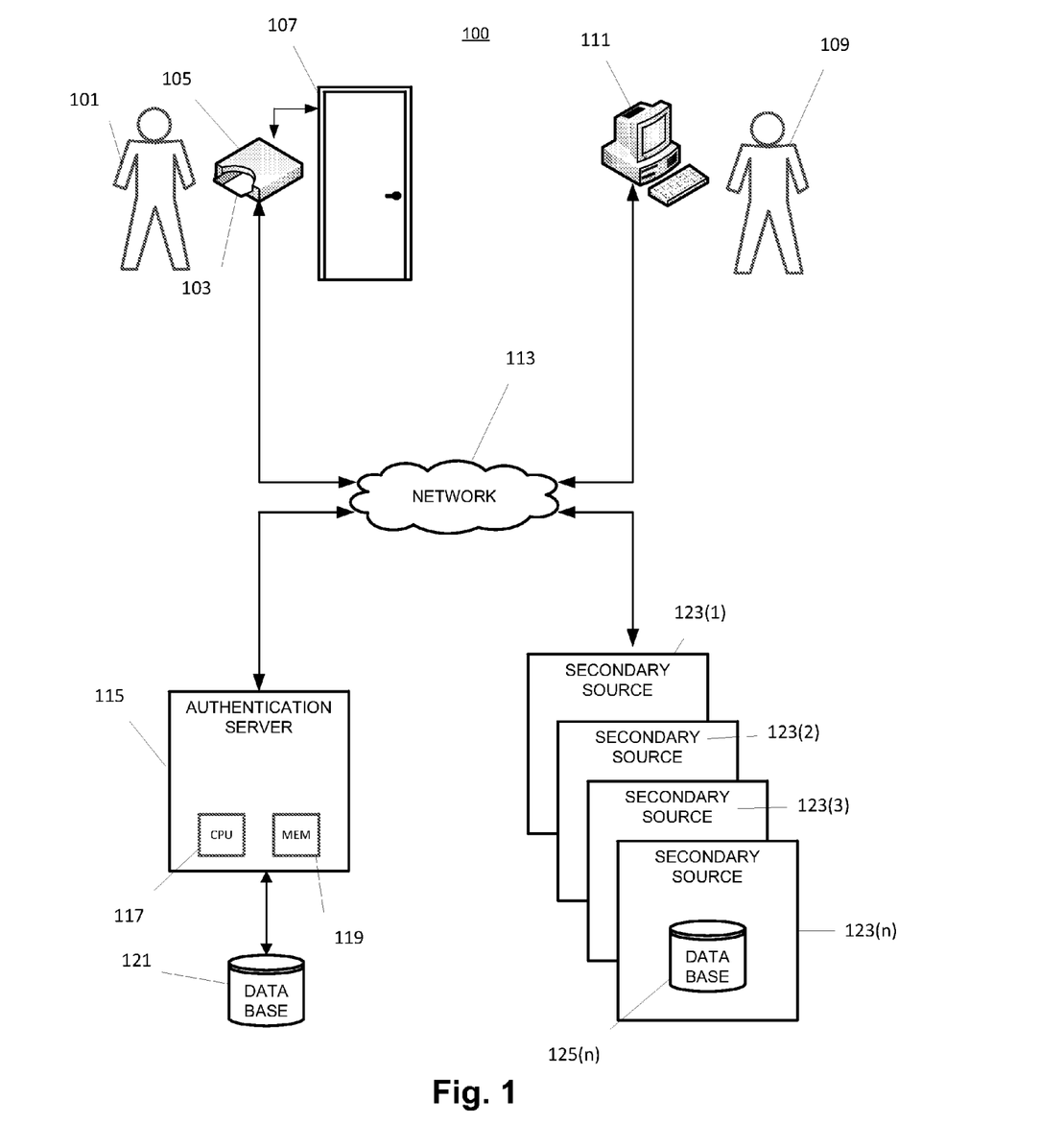
FIG. 1 is a schematic diagram illustrating an example system for authentication.

FIG. 1 is a schematic diagram illustrating an example system 100 for authentication of a user 101. The example system 100 includes a user 101 requesting access to a facility with an access card 103 placed into a card reader 105 for opening door 107 of the facility. A guard 109 sits at a workstation 111 which displays a digital picture of user 101 when he or she enters through the door 107. The guard 109 is required to view the user 101 and the graphic on the workstation 111 to further guarantee that the individual entering through the door 107 is in fact user 101. The system 100 further includes a network 113 for communicating between devices of the system.

The system 100 further includes an authentication server 115 with a database 121 containing authentication data such as records that include information related to the card 103 used by user 101. The authentication data also includes at least a digital picture of the user 101 used for secondary identification. The authentication server 121 also has a central processing unit (CPU) 117 for executing a computer program loaded in to a memory (MEM) 119 from a non-transitory storage such as the database 121.

The authentication system 100 also includes a set of secondary sources 123[1 . . . n] for providing information about the user 101. The set of secondary sources 123[1 . . . n] each include a database 125[1 . . . n] storing the secondary information of the user 101.

An example of the use of the authentication system 100 has an individual with user 101's access card 103, insert the access card 103 into the card reader 105. Alternatively or in addition to inserting the card 103 in the card reader 105, the user requesting access may enter a personal identification number (PIN) on a key pad (not shown) of the card reader 105. The card reader 105 transmits information received from the card 103 and/or the key pad of the card reader 105 across the network 113 to the authentication server 115. The authentication server 115 compares the information retrieved from the card 103 by the card reader 105 to information in the database 121.

The authentication server 115 matches the information retrieved from the card 103 to information in the database 121 and determines that the user 101 is allowed to enter through the door 107. The authentication server 115 sends a signal across the network 113 to the card reader 105 to open the door. The card reader 105 transmits a signal to a lock on the door 107 and unlocks the door.

The authentication server 115 in parallel with the command to open the door also transmits to the workstation 111 a digital picture of the user 101. The workstation 111 displays the picture and the guard 109 compares the picture displayed to the individual entering the facility. Alternately, the authentication server 115 can delay opening the door until the guard 109 signals back to the authentication server 115 that he has viewed the digital picture and the individual requesting access. The authentication server 115 would then transmit the command to card reader 105 open the door 107.

The authentication server 115, also transmits to the set of secondary sources 123[1 . . . n] a request for secondary information about the user 101. The secondary sources 123[1 . . . n] retrieve the information from their respective databases 125[1 . . . n] and return the information to the authentication server 115. The authentication server 115 evaluates the information returned by the secondary sources 123[1 . . . n]. The evaluation of the information considers the time that the information was gathered and the reliability of the secondary source as learned over time.

The authentication server 115 then assigns a score to the secondary information for each of the secondary sources 123[1 . . . n] that returned information based on the evaluation and a weight assigned to each secondary source 123[1 . . . n]. The authentication server 115 adds all the scores for the various secondary sources 123[1 . . . n] together to form a total score. It should be understood that other methods could be used to calculate and aggregate score.

For example, the secondary source 123(1) could be the virtual private network (VPN) for the company user 101 works for. The secondary source 123(1) indicates that user 101 logged on to the VPN seven minutes ago from an IP address that is thirty miles from the facility. The user 101 could not have traveled thirty miles in seven minutes and the authentication server 115 considers the information from the company to be highly reliable and assigns a large weight to the information.

The secondary source 123(2) could be an E-ZPASS® server that provides information about user 101's use of the E-ZPASS® system. The user 101's E-ZPASS® indicates that user 101 exited a highway fifteen minutes ago two miles from the address associated with the IP address returned by the secondary source 123(1). The authentication server 115 does not consider the information from the E-ZPASS® server (i.e. secondary source 123(2)) as highly reliable as someone could borrow user 101's car. Thus, the weight assigned to the secondary source 123(2) is lower. However, the two weighted scores are added together to form a total score.

If the total score from the secondary sources exceeds a predetermined value, then a signal is transmitted to the workstation 111 to display a red border that flashes or other indication to warn the guard that the individual entering the facility is possibly not the user 101 and issue an action to the guard to engage the individual and to require the individual perform further authentication. Alternatively, the authentication server 115 does not grant access to the facility until the step of checking the secondary sources 123[1 . . . n] is completed. The guard 109 engages the individual and checks the picture on the work station 111 closely or provides the individual entering the facility the opportunity to answer challenge questions or provide biometric information or use some other method of authentication that can be used to positively identify that the individual is in fact the user 101.

The guard 109 provides feedback to the authentication server 115 via the workstation 111 indicating whether the individual attempting to enter the facility was in fact user 101. The feedback the guard 109 provides to the authentication server 115 is used to help determine weighting in future authentication as the system will learn over time which secondary sources 123[1 . . . n] are more reliable than others.

Figure 2:
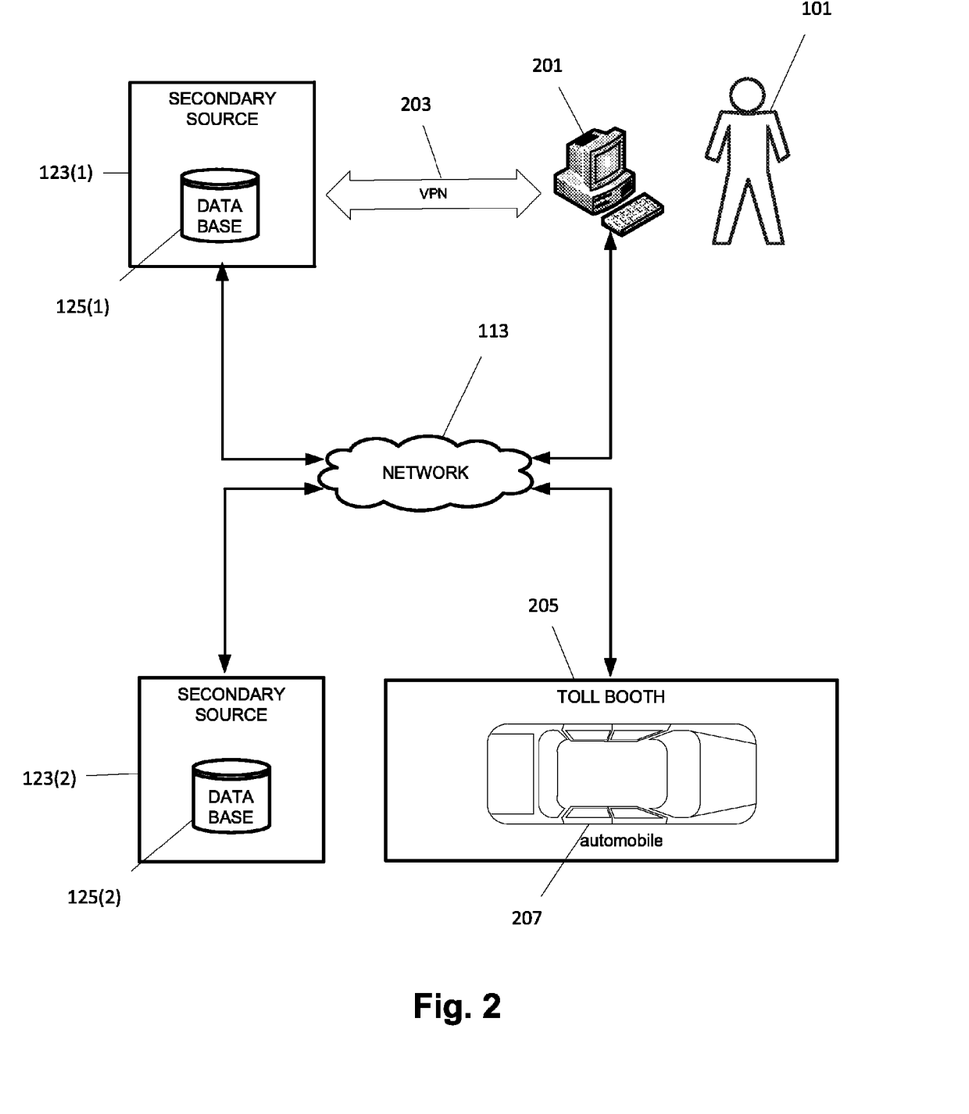
FIG. 2 is a graphic illustrating the collection of data by the secondary sources.

FIG. 2 is a graphic illustrating the collection of data by the secondary sources 123[1 . . . n]. The authentication server 115 uses many secondary sources 123[1 . . . n] to ensure that the individual presenting a credential to gain access to a facility or other entity is in fact the individual he or she claims to be. For example, the user 101 logs into his home computer 201 and establishes a VPN session 203. The VPN system, here labeled secondary source 123(1) stores information about the creation of the VPN session 203, such as the user id of the user 101 requesting the VPN session 203, the date and time the request was made and the IP address of home computer 201 and the physical address of home computer 201. The address stored by the secondary source 123(1) may be in the form of longitude and latitude or may indicate an offset from a given physical location, for example, the physical location of the facility where the secondary source 123(1) is located.

The secondary source 123(2) stores information obtained from an electronic toll collection system. The electronic toll collection system records information about when a user of the system enters a roadway in the automobile 207 through the toll both 205 and exist through a second toll booth. The information as to physical location is stored in a manner similar to that of the VPN. It should be understood that if the user 101 enters a roadway through the toll booth 205 and has yet to exit through a corresponding second toll booth and the records date and time stamp are fairly recent then the user 101 would be considered to be in transit.

The example, system includes two secondary sources 123 (1) and (2) using information from a VPN 203 an electronic toll collection system (i.e. secondary source 123(2)). The secondary sources used are not exhaustive and other secondary sources including credit card systems, sonar, biometric systems, corporate travel information, and the like could be used as secondary sources. Each of these secondary sources would have a weight given to the reliability of their information.

Figure 3:
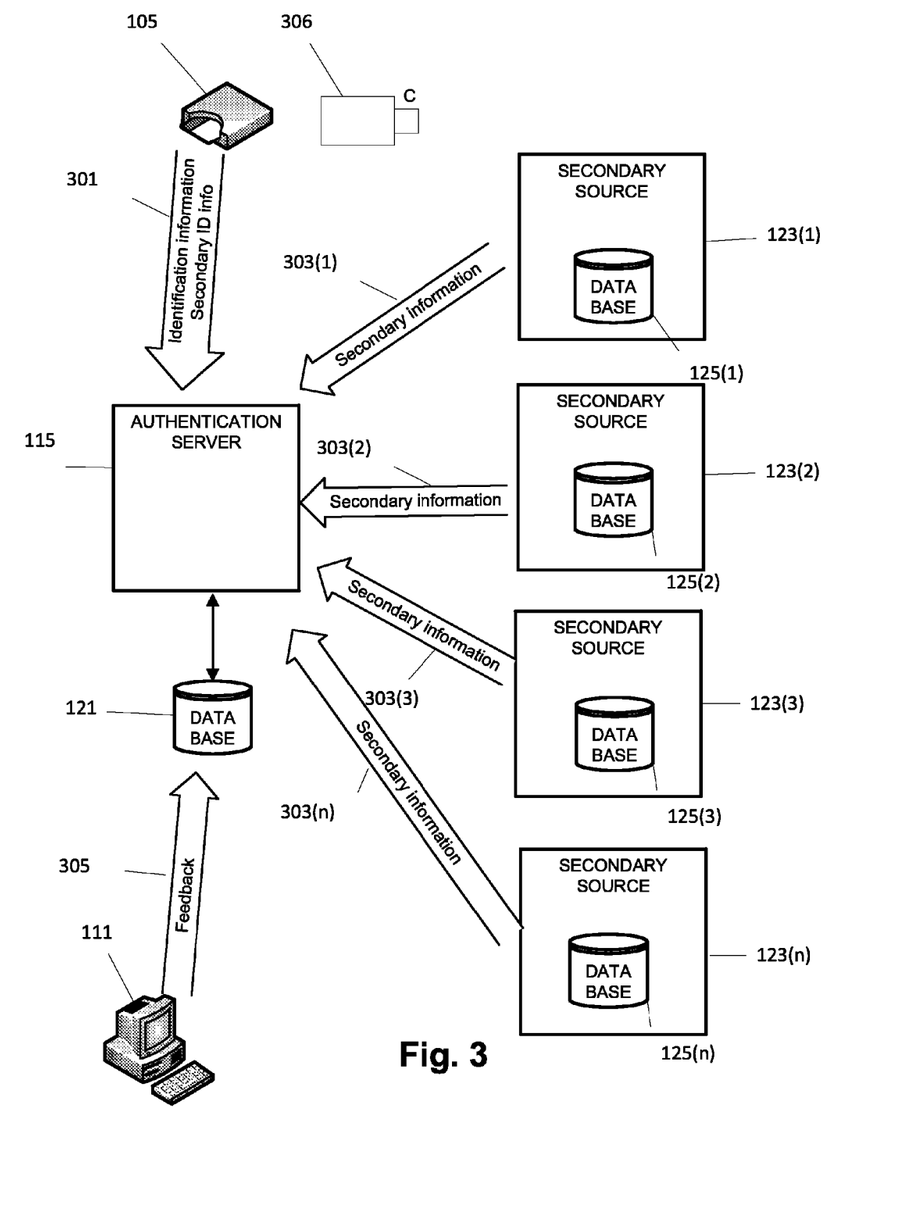
FIG. 3 is a graphic illustrating the secondary sources providing secondary information to the authentication server.

FIG. 3 is a graphic illustrating the secondary sources 123[1 . . . n] providing secondary information to the authentication server 115. When the user 101 attempts to enter a facility through door 107 the card reader 105 forwards identification information and access point information 301. The identification information is information read from the access card 103. The access point information could be biometric information gathered by other devices at the door 107, for example, a camera 306 at the door 107. The camera 306 can be used to ascertain the height of the individual requesting access as he or she passes the door 107 or perform facial recognition. Other biometric information such as facial recognition, finger prints or retina scan could be used. The access point information also includes the physical location of the card reader. Each secondary sources 123[1 . . . n] also provides secondary information 303[1 . . . n] to the authentication server 115. The secondary information 303[1 . . . n] forms a set of secondary information records. As discusses above, the secondary information is not limited to information as to physical location, but can also include biometric information or other information that can be used to question whether the individual attempting to enter a facility is the user 101.

The authentication server 115 uses the set of secondary information records 303[1 . . . n] to compare against the access point information to determine whether the confirmation based upon the user 101's access card 103 matching a record in the authentication database 121 is valid.

The guard 109 at the work station 111, despite the indication that a secondary authentication is required, determines that the individual entering the facility is in fact user 101 and transmits feedback 305 that the system was incorrect. The weight used by the secondary sources 123[1 . . . n] has an initial value set by an administrator that is lowered reflecting the unreliability of the weight in response to the feedback 305. Alternatively, if the individual entering the facility is not the user 101, the initial value set by the administrator is increased reflecting greater reliability in response to the feedback 305.

The weights assigned to the secondary sources 123[1 . . . n] may also be modified due to other factors and outside influences. For example, if someone hacked the electronic toll collection system and could change records in the electronic toll collection system database at will, then the reliability of information coming from that system would drop, as should the weight applied to that information.

Figure 4:
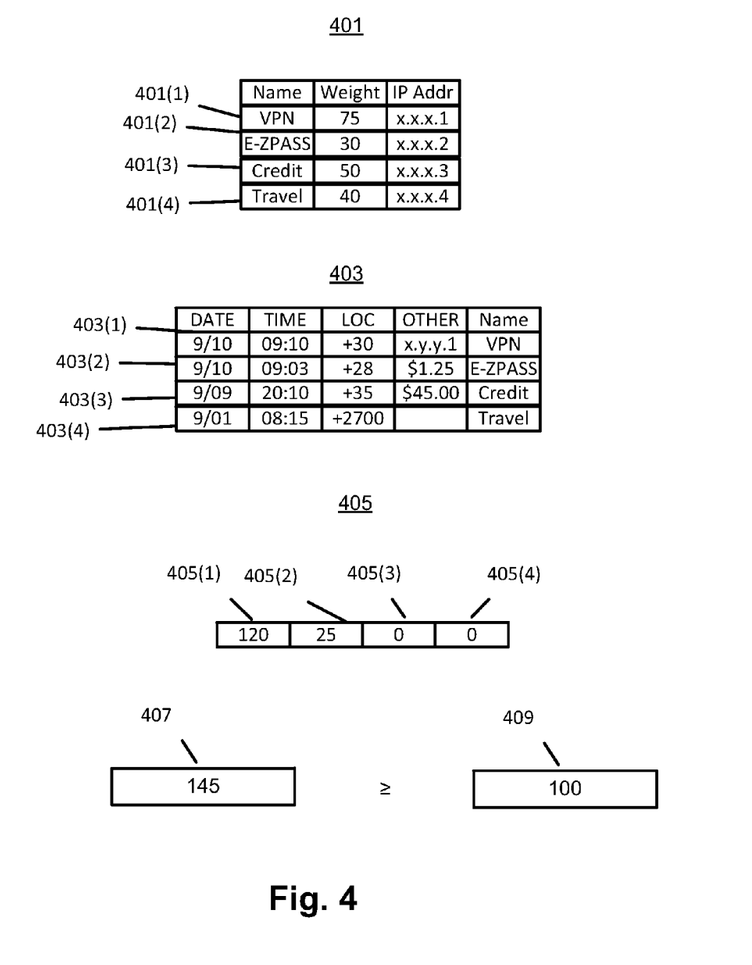
FIG. 4 is a graphic illustrating the data used by the authentication server to make a decision regarding the secondary sources.

FIG. 4 is a graphic illustrating the data used by the authentication server 115 to make decisions about secondary sources. The authentication server 115 includes a set of records 401 that include information on secondary sources 123[1 . . . n]. Each record of the set of records 401 includes at least a name of the secondary source, a weight given to information received from this secondary source, and the IP address or URL where the secondary source can be reached across the network 113. The set of records 401 includes a reference to the VPN 401(1) for the company that at which user 101 works. As the VPN is a company resource it is given a particularly high weight of 75 on a scale of 1-100. It is understood that other scales and different weights could be used. The set of records 401 also includes a reference to an electronic toll collection system 401(2). Since more than one individual can drive user 101's car, the information collected from this secondary source is given a lower weight of 30. The secondary sources 123[1 . . . n] also include a credit card company 401(3) that has issued a credit card to user 101. Credit cards are of medium weight of 50 as to reliability of their information. The secondary sources 123[1 . . . n] also includes information of the company that user 101 is employed by internal travel database 401(4). The internal travel database 401(4) is initially given a low-medium weight of 40 as individuals travel plans change and are not always reflected in the travel database immediately.

The authentication system 115 makes requests from each secondary source 123[1 . . . n] records for user 101 based on the set of records 401. The records are returned to form a set of secondary records 403. The set of secondary records 403 include at least a date and time that each record was created or last updated, a physical location associated with a creation of the record and other information that can be used to further determine the authentication of the individual requesting entry to the facility.

The authentication system 115 first looks at the date and time for each record to determine whether the record is relevant. For example, the time of the request to enter the facility is 09:17 on the tenth of September. Secondary record 403(1) returned by the VPN system is only seven minutes old. Thus, the authentication system 115 considers the record relevant. The authentication system 115 also concludes that someone logged onto user 101's account seven minutes ago thirty miles away based on the IP address of the request to create a VPN. Since user 101 could not travel thirty miles in seven minutes the data is considered relevant. As discussed about the VPN system 401(1) has a weight of 75 as it is a trusted system. The distance, time and weight are factored to produce a score 405(1) of 120 for this secondary record 403(1).

The authentication system 115 likewise determines that the secondary record 403(2) was produced 15 minutes ago and therefore is relevant. The physical location provided is also 28 miles away. The distance, time and weight are factored to produce a score 405(2) of 25 for this secondary record 403(2). The score 405(2) of 25 could be higher or changed based upon its correlation with the physical location of the secondary record 403(1).

The authentication system 115 discounts secondary records 403(3) and 403(4) as their respective timestamps (i.e. date/time) are at least eleven hours old and nine days old respectively. The authentication system 115 sets the score 405(3) and (4) to 0 for the secondary records 403(3) and (4). The authentication system 115 then computes an aggregate score 407 of each of the scores 405. The authentication system 115 compares the aggregate weight 407 to a predetermined score 409. If aggregate score 407 is greater than the predetermined score 409 the authentication system 115 warns the guard 109 that the individual entering the facility may not be the user 101. It should be understood that the predetermined value 409 may be a system wide value, a value specific to user, or a value specific to a group of users.

Figure 5:
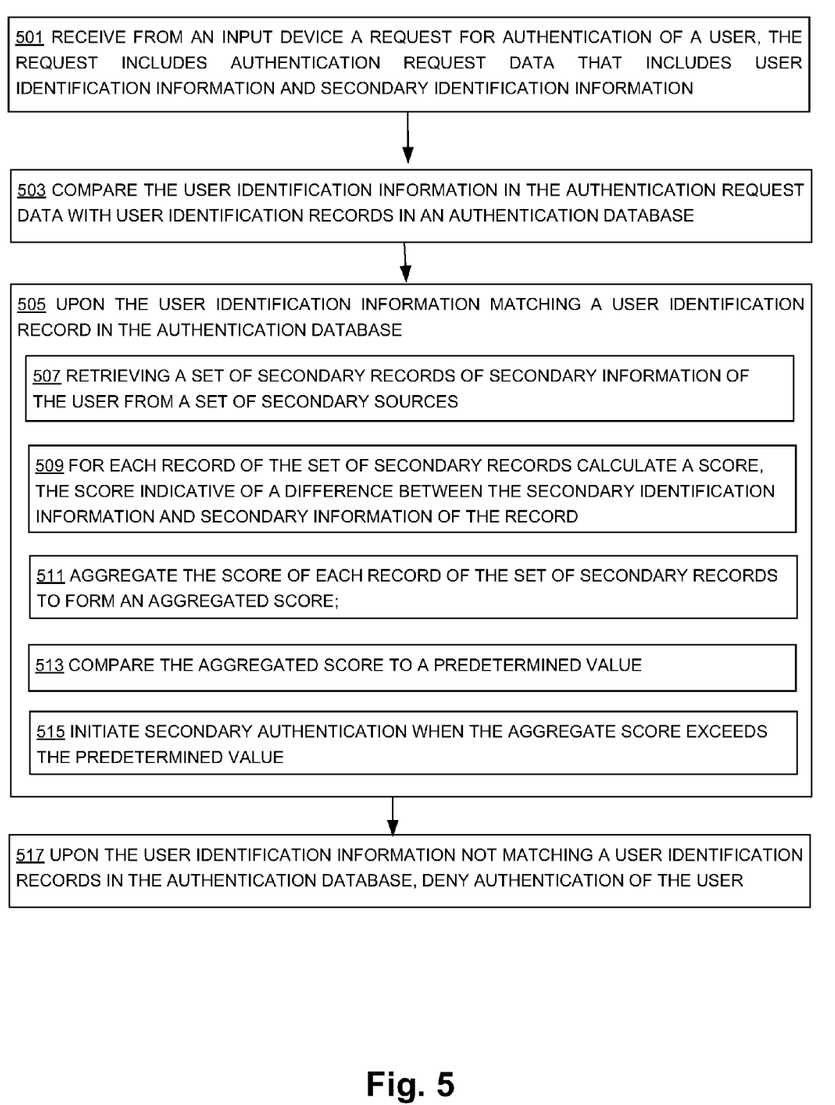
FIG. 5 is a flowchart illustrating a method of mitigating confirmational bias during authentication of a user.

FIG. 5 is a flowchart illustrating a method of mitigating confirmational bias during authentication of a user 101. The authentication server 115 receives (501) from an input device 105 a request for authentication of a user 101, the request including user identification information and access point information 301. The authentication server 115 the compares (503) the user identification information 301 with user identification records in an authentication database 121. The authentication server 115 then determines if (505) the user identification information 301 matches a user identification record in the authentication database 121 and retrieves (507) a set of secondary records 403 of secondary information 303[1 . . . n] of the user 101 from a set of secondary sources 123[1 . . . n]. The authentication server 115 sets (509) a score 405 for each record of the set of secondary records 403, the score 405 indicative of a difference between the access point information 301 and secondary information of the record 403. The authentication server 115 then aggregates (511) the score 405 of each record of the set of secondary records 403 to form an aggregated score 407 and compares (513) the aggregated score to a predetermined value 409. If the score 407 is greater-than-or-equal-to the predetermined value 409 then the authentication server 115 initiates secondary authentication (515).

The authentication server 115 can also determine that the user identification information 301 does not match a user identification records in the authentication database 121 and deny 517 authentication of the user 101.

While various embodiments of the present disclosure have been particularly shown and described, it will be understood by those skilled in the art that various changes in form and details may be made therein without departing from the spirit and scope of the present disclosure as defined by the appended claims.

For example, FIG. 1 discloses a client server relationship. In other embodiments the relationship could be peer-to-peer. Further, FIG. 1 discloses the system as using a computer program stored on a database 121 loaded into memory 119 and executed by a processor 117. It should be understood that at any instance in time the computer program executing in the processor 117 forms a circuit for each software module or step.

The authentication server 115 may authenticate the user 101 based upon matching a record in the authentication database 121 or may delay the authentication until the secondary information 303[1 . . . n] is compared to access point information transmitted with the request for authentication.

What is claimed is:

1. A method of mitigating confirmational bias during authentication, the method comprising:
receiving from an input device a request for authentication of a user, the request including user identification information and access point information;
comparing the user identification information with user identification records in an authentication database;
upon the user identification information matching a user identification record in the authentication database:
retrieving a set of secondary records of secondary information of the user from a set of secondary sources;
for each record of the set of secondary records calculating a score, the score indicative of a difference between the access point information and secondary information of the record;
aggregating the score of each record of the set of secondary records to form an aggregated score;
comparing the aggregated score to a predetermined value; and
initiating secondary authentication upon the aggregate score exceeding the predetermined value; and
upon the user identification information not matching a user identification records in the authentication database, denying authentication of the user.

2. The method according to claim 1, wherein upon the user identification information matching the user identification record in the authentication database,
authenticating the user prior to retrieving a set of secondary records of secondary information of the user from the set of secondary sources.

3. The method according to claim 2, wherein upon the user identification information matching the user identification record in the authentication database,
authenticating the user only upon the aggregate score being below the predetermined value.

4. The method according to claim 1, wherein setting the score indicative of a difference between the access point information and secondary information of the record includes:
comparing the timestamp of the secondary information of the record and a current timestamp;
upon the difference between the timestamp of the secondary information of the record and the current timestamp being greater than a predetermined time set the score to zero.

5. The method according to claim 4, wherein setting the score indicative of a difference between the access point information and secondary information of the record includes:
computing a distance between a physical location in the access point information and a physical location in the secondary information of the records;
factoring the distance between the location in the access point information and a location in the secondary information of the records with a weight assigned to each secondary source to form the score.

6. The method according to claim 5, wherein the weight assigned to each secondary source includes:
setting an initial weight; and
modifying the weight based upon the feedback received in response to initiate secondary authentication.

7. The system according to claim 5, wherein the weight assigned to each secondary source includes:
set an initial weight; and
modify the weight based upon the feedback received in response to initiate secondary authentication.

8. A system for mitigating confirmational bias during authentication, the system comprising:
an authentication circuit, the authentication circuit arranged and configured to receive from an input device a request for authentication of a user, the request including user identification information and access point information;

the authentication circuit further arranged and configured to compare the user identification information with user identification records in an authentication database;

upon the user identification information matching a user identification record in the authentication database:
  a secondary authentication circuit, the secondary authentication circuit arranged and configured to retrieving a set of secondary records of secondary information of the user from a set of secondary sources;
  for each record of the set of secondary records calculating a score, the score indicative of a difference between the access point information and secondary information of the record;
  the secondary authentication circuit further arranged and configured to aggregate the score of each record of the set of secondary records to form an aggregated score;
  the secondary authentication circuit further arranged and configured to aggregate compare the aggregated score to a predetermined value; and
  initiate secondary authentication upon the aggregate score exceeding the predetermined value; and the authentication circuit further arranged and configured to upon the user identification information not matching a user identification records in the authentication database, deny authentication of the user.

9. The system according to claim 8, wherein upon the user identification information matching the user identification record in the authentication database,
  the user is authenticated prior to retrieving a set of secondary records of secondary information of the user from the set of secondary sources.

10. The system according to claim 9, wherein upon the user identification information matching the user identification record in the authentication database,
  the user is authenticated only upon the aggregate score being below the predetermined value.

11. The system according to claim 10, wherein setting the score indicative of a difference between the access point information and secondary information of the record includes:
  compare the timestamp of the secondary information of the record and a current timestamp;
  upon the difference between the timestamp of the secondary information of the record and the current timestamp being greater than a predetermined time set the score to zero.

12. The system according to claim 11, wherein setting the score indicative of a difference between the access point information and secondary information of the record includes:
  compute a distance between a location in the access point information and a location in the secondary information of the records;
  factor the distance between the location in the access point information and a location in the secondary information of the records with a weight assigned to each secondary source to form the score.

13. A non-transitory computer readable storage medium with a computer program stored thereon, the computer program executed by a processor to perform the method of mitigating confirmational bias during authentication, the method comprising:
  receiving from an input device a request for authentication of a user, the request including user identification information and access point information;
  comparing the user identification information with user identification records in an authentication database;
  upon the user identification information matching a user identification record in the authentication database:
    retrieving a set of secondary records of secondary information of the user from a set of secondary sources;
    for each record of the set of secondary records calculate a score, the score indicative of a difference between the access point information and secondary information of the record;
    aggregating the score of each record of the set of secondary records to form an aggregated score;
    comparing the aggregated score to a predetermined value; and
    initiating secondary authentication upon the aggregate score exceeding the predetermined value; and
  upon the user identification information not matching a user identification records in the authentication database, denying authentication of the user.

14. The non-transitory computer readable storage medium according to claim 13, wherein upon the user identification information matching the user identification record in the authentication database,
  authenticating the user prior to retrieving a set of secondary records of secondary information of the user from the set of secondary sources.

15. The non-transitory computer readable storage medium according to claim 13, wherein upon the user identification information matching the user identification record in the authentication database,
  authenticating the user only upon the aggregate score being below the predetermined value.

16. The non-transitory computer readable storage medium according to claim 13, wherein setting the score indicative of a difference between the access point information and secondary information of the record includes:
  comparing the timestamp of the secondary information of the record and a current timestamp;
  upon the difference between the timestamp of the secondary information of the record and the current timestamp being greater than a predetermined time set the score to zero.

17. The non-transitory computer readable storage medium according to claim 16, wherein setting the score indicative of a difference between the access point information and secondary information of the record includes:
  computing a distance between a location in the access point information and a location in the secondary information of the records;
  factoring the distance between the location in the access point information and a location in the secondary information of the records with a weight assigned to each secondary source to form the score.

18. The non-transitory computer readable storage medium according to claim 17, wherein the weight assigned to each secondary source includes:
  setting an initial weight; and
  modifying the weight based upon the feedback received in response to initiate secondary authentication.

* * * * *